United States Patent [19]

Inoue

[11] Patent Number: 5,591,637
[45] Date of Patent: Jan. 7, 1997

[54] METHOD FOR MANUFACTURING OF ORGANIC FERTILIZERS AND DEVICE THEREOF

[76] Inventor: Satoshi Inoue, 1214, Oiso, Oiso-Machi, Naka-Gun, Kanagawa, Japan

[21] Appl. No.: 365,704

[22] Filed: Dec. 29, 1994

Related U.S. Application Data

[62] Division of Ser. No. 720,454, filed as PCT/JP90/00825 filed Jun. 26, 1990, Pat. No. 5,401,291.

[51] Int. Cl.⁶ .............................. C05F 3/06; C12M 1/16
[52] U.S. Cl. ................................... 435/290.2; 435/290.4; 435/291.7
[58] Field of Search ........................... 435/290.2, 290.4, 435/291.7

[56] References Cited

U.S. PATENT DOCUMENTS 4,201,128  5/1980  Whitehead et al. .
4,786,308  11/1988  Colling .
5,169,782  2/1991  Murphy .

*Primary Examiner*—David A. Redding
*Attorney, Agent, or Firm*—Wenderoth, Lind & Ponack

[57] ABSTRACT

There is provided a method and apparatus for manufacturing organic fertilizers by fermentation of a mixture of livestock excrement with cellulose containing organic materials, said mixture containing thermophilic and aerobic microorganisms, which method comprises adjusting moisture content of said mixture to 25–75 wt %, cutting and kneading said mixture until the temperature thereof goes up to 40° C.–90° C. by the elevated pressure and friction caused by said cutting and kneading, thereby causing thermophilic organisms to be activated, followed by pulverizing the thus-treated mixture while contacting it with air, thereby causing the aerobic organisms to be activated.

3 Claims, 4 Drawing Sheets

METHOD FOR MANUFACTURING OF ORGANIC FERTILIZERS AND DEVICE THEREOF

This is a divisional application of Ser. No. 07/720,454, filed Jun. 25, 1991 now U.S. Pat. No. 5,401,291, which is the U.S. National Stage Application of PCT/JP90/00825, filed Jun. 26, 1990.

FIELD OF THE INVENTION

The present invention relates to a method for manufacturing organic fertilizers by artificial treatment of livestock excrement, such as chicken-, cattle-manures with cellulose-containing organic materials such as grasses, hulls, straws, wood-chips, etc. into organic fertilizers within a short time, and a device for performing said method.

BACKGROUND TECHNOLOGY OF THE PRESENT INVENTION

An enormous quantity of excrement exhausted from the large-scale livestock industry is left as such due to lack of appropriate treating methods, and environmental pollution caused by bad odor and discharge thereof without treatment have created a social problem.

In general, it requires 5–6 months to compost excrements of chicken, cattle, swine, etc., and cellulose-containing coarse organic materials used as beds thereof, such as grasses, straws, hulls, woodchips, etc. by leaving them as such in nature. This is very inefficient and generates bad odors during that period. It has also been difficult to obtain evenly-fermented compost of good quality because of unevenness fermentation between the surface and interior parts.

The present invention has been accomplished focusing on the above points. The first purpose is to present a method for manufacturing composts of good quality within a short time. And a second purpose is to present a device which is suitable to perform the above method.

DISCLOSURE OF THE PRESENT INVENTION

The first purpose of the present invention, shown above, can be-achieved by adjusting moisture content of raw materials containing livestock excrement and cellulose-containing organic materials used as beds thereof, such as grasses, straws, hulls, wood chips, etc. to 25–75%, elevating temperature of this mixture to 40°–90° C. by cutting and kneading under mechanical pressure, followed by pulverizing this with exposure to air by releasing this suddenly into decreased atmospheric pressure.

In order to ensure accelerated fermentation, better result is obtained by adjusting pH thereof with a pH-adjusting agent in order that pH value during the fermentation process should be in a range of pH 6–9, as well as adjusting moisture content of a mixture of livestock excrements and cellulose-containing organic materials, such as grasses, straws, hulls, woodchips, etc., to 25–75%, and this pH-adjusted mixture is cut and kneaded under elevated pressure and temperature thereof is increased to 40°–90° C. by compression and friction caused by kneading, then the treated mixture is released from the compressed state with exposure to air, where, moisture adjustment is successfully performed by the addition of a resultant dry fertilizer of the present invention.

The second purpose of the present invention can be accomplished using a device composed by connecting the front end of a cylindrical primary treatment tank having a hopper for feeding raw materials, through an open/close gate, to the rear end of a cylindrical secondary treatment tank which is equipped with an out-put opening at the front end, where the primary treatment tank is equipped with a screw conveyor for compression and transportation and a system for cutting and kneading inside, and the secondary treatment tank is equipped with rotary blades for crushing, and at the rear end thereof, is equipped with a ventilator.

The screw conveying system is preferably to be composed of a main compressing screw which conveys raw materials toward the open/close gate, and an auxiliary compressing screw for conveying the raw materials into reverse direction.

The cutting/kneading system can be composed of rotary blades on a rotary shaft and fixed blades projecting to the inside of the primary treatment tank corresponding to the rotary blades, where the projection length of the fixed blades is preferably to be adjustable.

In the method of the present invention, the temperature of raw materials is elevated to 40°–90° C. by means of mechanical compression and kneading, accordingly, microorganisms are activated by physical and thermal stimulations, and cellulose-containing organic materials are crushed into small fragments by the compression and kneading. Therefore, livestock excrements, which are main nutrients for microorganisms, are evenly distributed, thus, the microorganisms are activated in a circumstance where conditions for growth thereof, such as temperature, moisture, etc., are even, therefore, all microorganisms start their activities simultaneously and ferment the raw materials within a short time. In such a case, thermophilic microorganisms propagate quickly in the primary treatment tank and number of psychrophilic microorganisms decreases relatively. In the secondary treatment tank, aerobic microorganisms propagate abruptly since treated material has been released from the compressed state and pulverized, accordingly anaerobic microorganisms decrease relatively in number.

Thus, thermophilic microorganisms and aerobic microorganisms, which are useful for fermentation, are activated and propagate quickly, and since psychrophilic microorganisms and anaerobic microorganisms which cause bad odor decrease, composts of good quality and without bad odor can be manufactured within a short time.

Range of pH for important microorganisms for the fermentation, such as cellulose-decomposing microorganisms, is 6–9, and the most optimum pH is 7–8. The value of pH of raw materials can be too low due to production of organic acids during the fermentation and pH can be too high due to presence of excess ammonia, and both cause delay in fermentation. This problem can be resolved by adjustig pH in prior with the addition of a pH-adjusting agent in order that pH value during fermentation will be within a range of pH 6–9. Besides, fertilizing ability of the products can be improved by the use of a pH-adjusting agent which is a fertilizer as well.

With said device of the present invention, temperature of the materials in the primary treatment tank goes up due to compression caused by the screw conveyor and cutting and kneading, and the materials are abruptly released from an elevated pressure into a decreased pressure in the secondary treatment tank, and is pulverized with aeration in the secondary treatment tank. Thus, the raw materials can be treated and taken out as a compost after a single treatment by a series of device.

1: Primary treatment tank.
2: Secondary treatment tank.
3: Open/close gate.
7: Screw conveying system.
7a: Primary screw.
7b: Secondary screw.
8: Cutting/kneading system.
8a: Rotary blades.
8b: Fixed blades.
9: Opening for feeding.
10: Opening for taking out.
11: Rotary pulverizing blades.
12: Ventilation system.
15: Raw materials.
16: Products.

BEST MODE OF THE PRESENT INVENTION

Examples of the present invention are explained with the attached drawings below.

Figure 1:
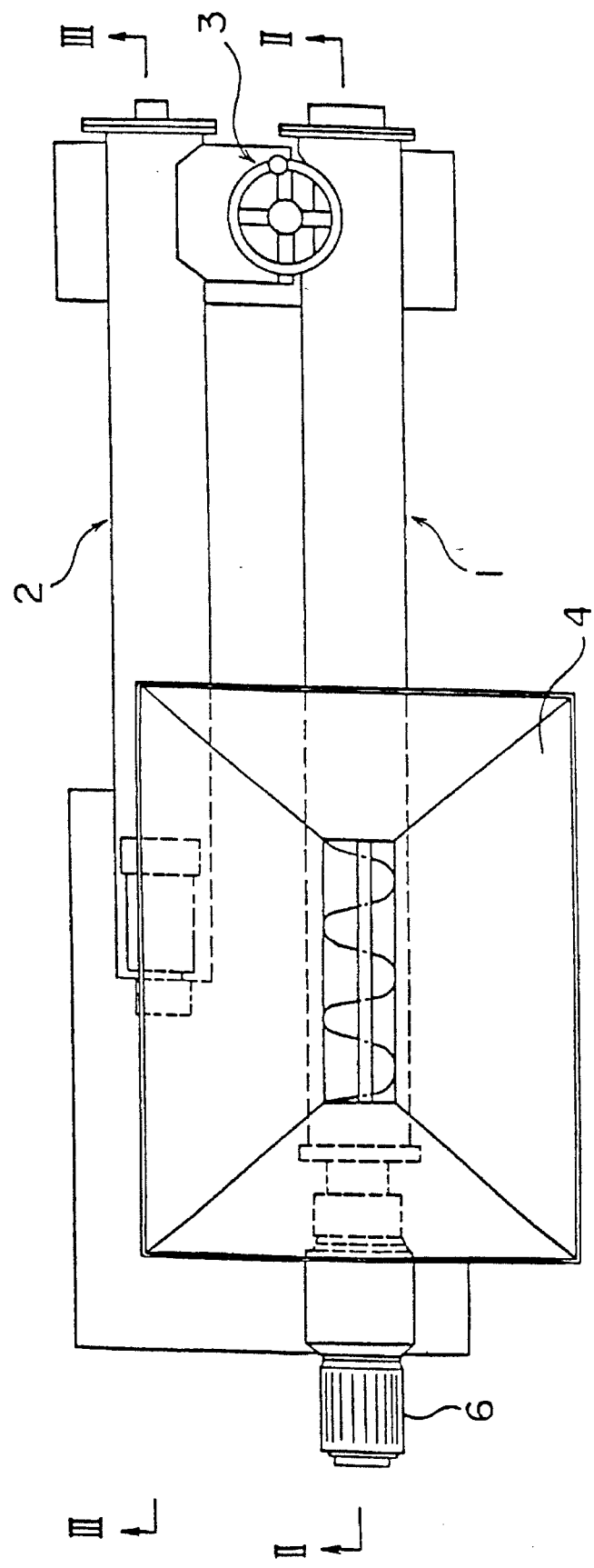
FIG. 1 is a plane view of the device for manufacturing of organic fertilizer of the present invention.
Figure 2:
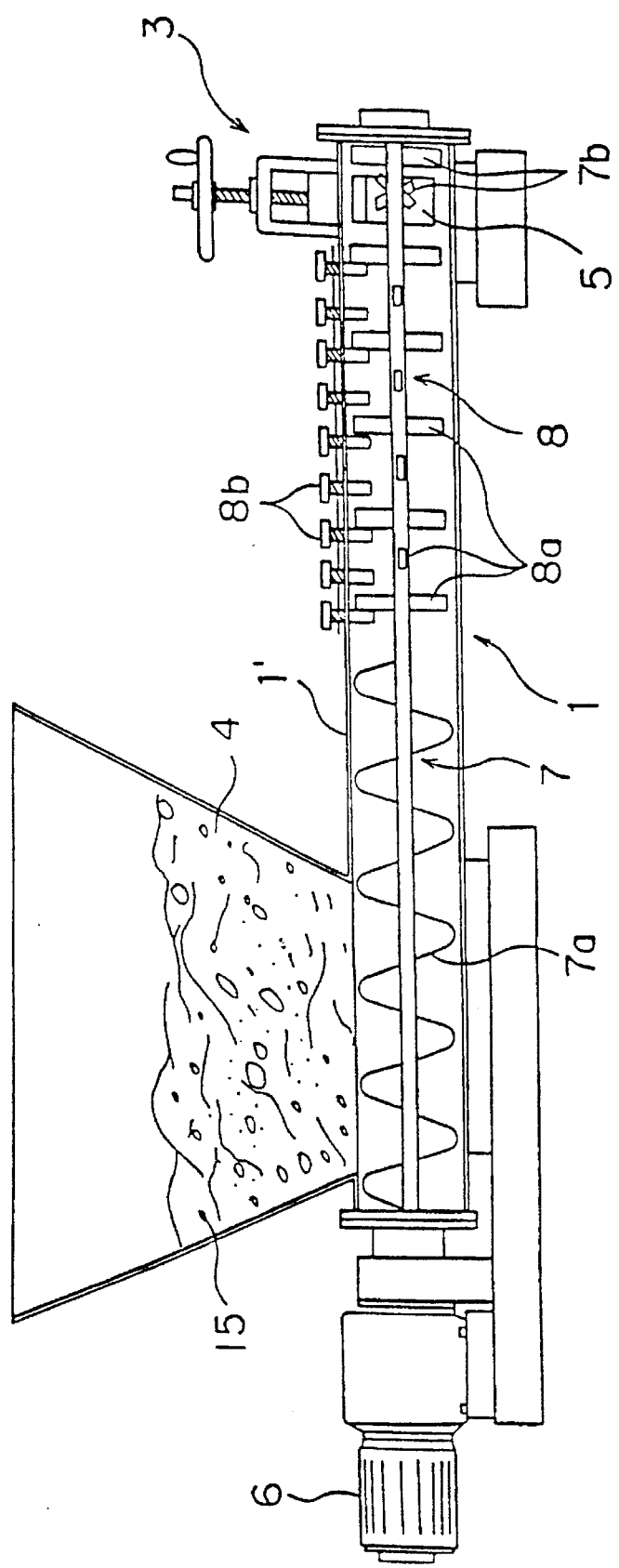
FIG. 2 is a cross section along the line II—II of FIG. 1.
Figure 3:
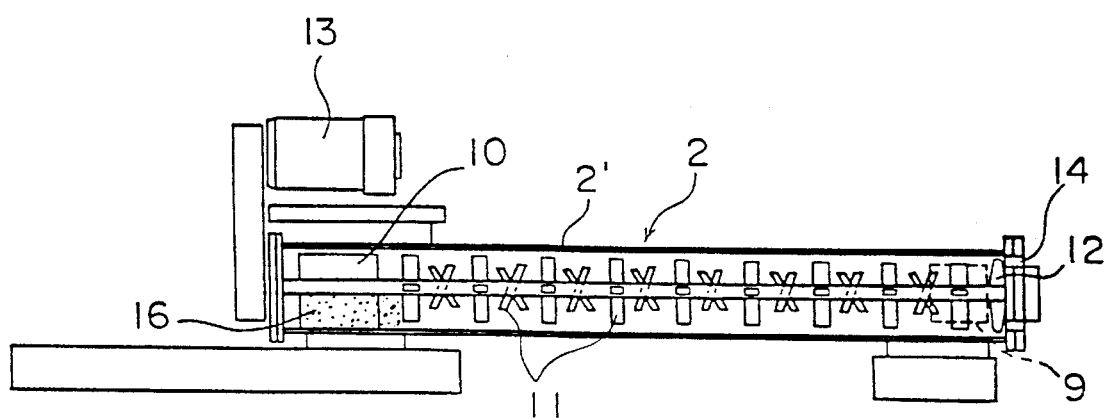
FIG. 3 is a cross section along the line III—III of FIG. 1.
Figure 4:
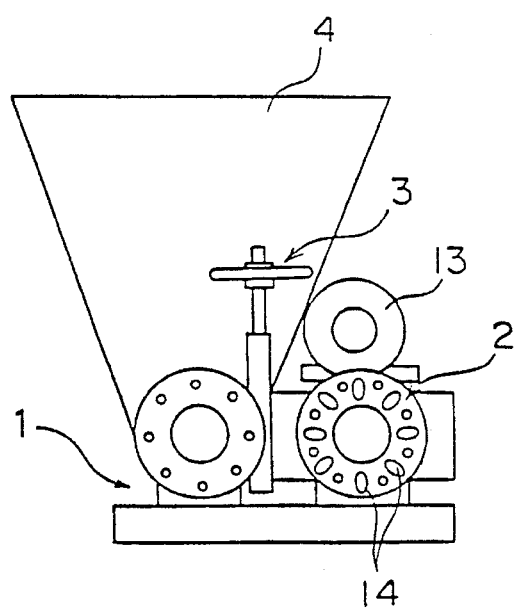
FIG. 4 is a right-side elevation view of FIG. 1.

As shown in FIG. 1, the device for manufacturing organic fertilizers consists of a cylindrical primary treatment tank (1), and a cylindrical secondary treatment tank (2), connected through an open/close gate (3).

The primary treatment tank composed of cylinder (1)' which is equipped with a hopper (4) for imput of raw materials on one end and an opening (5) connected to an open/close gate (3). And within the cylinder (1)', a screw conveyor (7) driven by a motor or a similar system and a cutting/kneading system (8) are equipped.

As the screw conveyor (7) transports while compressing the raw materials fed to the hopper (4) toward the open/close gate (3), it is desirable to provide with a secondary screw (7b) which rotates to the reverse direction to that of the primary screw (7a). and besides the main screw (7a) part of which is located just below the hopper. This secondary screw is provided close to the opening (5) of the primary treatment tank facing the primary screw (7a), so as to play a role to further compress the raw materials having been transported and compressed by the primary screw (7a).

The cutting/kneading system (8) is provided next to the primary screw (7a), in other words, between the primary screw (7a) and the secondary screw (7b).

The cutting/kneading system (8) consists of blades in plural number, which is rotated by a driving system such as a motor, and fixed blades (8b) projecting into the primary treatment tank, corresponding to the rotary blades (8a).

The fixed blades (8b) promote shearing of raw materials by means of grinding with the rotary blades (8a) and prevent co-rotating of the raw materials with the rotary blades (8a), and also act as baffle boards for compressed transportation of the raw materials. The fixed blades, therefore, are preferably to be provided in the primary treatment tank with a screw-driving system or similar thereto in order that the fixed blades (8b) can be driven forward and backward, which enables one to control temperature, caused by compression and friction, by adjusting the height of the fixed blades (8b).

The secondary treatment tank (2) consists of a cylindrical tank (2') which has an entrance (9), connected to the aforesaid open/close gate (3), on one end, and an opening for taking out of products (10) on the other end. Within the cylinder (2'), rotary pulverizing blades (11) which drive the treated materials toward the out-put opening (10) while pulverizing the treated mateials are equipped, and a blower (12) for taking air into the cylinder is provided on the side of the entrance (9) .

In the drawings shown as an example, both the rotary pulverizing blades (11) and the blower (12) are on the same rotary shaft driven by a rooter (13). In the drawings, (14) is an opening for air intake for the blower (12).

The method of the present invention to manufacture composts using the device shown by the drawings is as below.

First of all, livestock excrements, such as chicken feces, cattle/horse feces, etc. and cellulose-containing organic materials, such as grasses, straws, hulls, wood chips (preferably those having used as livestock beds) are taken as raw materials (15), and moisture content thereof is adjusted to 25% to 75%, and the moisture-adjusted raw materials (15) are fed to the primary treatment tank (1) through the hopper (4).

The raw materials (15) are transported by the primary screw (7a) of the compressing transportation system (7), and finely crushed by the cutting/kneading system (8) on the way, where the cutting/kneading system, particularly the fixed blades (8b) thereof play a role as baffle boards.

The raw materials transported by the primary screw (7a), therefore, are cut and kneaded while being compressed, therefore, temperature is increased quickly due to heat of compression and heat of friction. In this case, intensity of kneading friction, quantity of raw materials to be transported etc., can be adjusted by adjusting the projection length of the fixed blades (8b), and the temperature can further be increased by elevating the internal pressure by providing with the secondary screw (7b).

Thus, the temperature of raw materials (15) in the primary treatment tank (1) is elevated by compression and kneading, and mechanical and thermal stimulation activates microorganisms, therefore fermentation is performed homogeneously and accelerated. Therefore, thermophilic microorganisms propagate because of the elevated temperature, and and psychrophilic microorganisms dcrease in number, as a result, bad odor is repressed.

Adjustment of the open/close gate (3) regulates discharge of the treated materials whereby internal pressure and temperature are adjusted. Thus, the materials treated in the primary treatment tank by means of compression and kneading is heated to 40°–90° C. and discharged through the open/close gate (3).

The high temperature materials discharged through the open/close gate (3) are transported into the secondary treatment tank (2) where the treated materials are pulverized by high-speed rotary blades in the secondary treatment tank (2) while being contacted with air, and thus the treated materials are evenly exposed to oxygen. As a result, aerobic microorganisms are activated and grow rapidly and accelerate fermentation, by which bad odor is further repressed because of decrease in number of anaerobic microorganisms.

Thus, the treated materials having been pulverized under aeration are discharged as an organic fertilizer (16) through the output opening (10). As already stated, main microorganisms for fermentation, such as cellulose-decomposing microorganisms, have their pH range for growth in the range of pH 6–9, and their optimum pH for growth is pH 7–8.

Value of pH in the raw materials tends to be decreased by organic acids produced during the process of fermentation as products, and these cause delay in fermentation. Similarly, delay in fermentation is caused in case of higher pH value due to presence of excess quantity of ammonia in the raw materials. For the purpose of accelerating fermentation, by means of adjusting pH, and also of improving fertilizing ability of products, it is desirable to adjust pH beforehand, in order that pH during fermentation will stay within a range of pH 6–9, by the addition of a pH-adjusting agent which contains calcium and can be used as a fertilizer, such as calcium silicate, calcium cyanamide, calcium oxide, calcium hydroxide, calcium carbonate, magnesia calcium oxide, magnesia calcium hydroxide, etc. in case of pH-decreasing tendency, or a phosphate fertilizer such as superphosphate, concentrated superphosphate, etc. when pH becomes too high, at the time of moisture adjustment or after.

Figure 5:
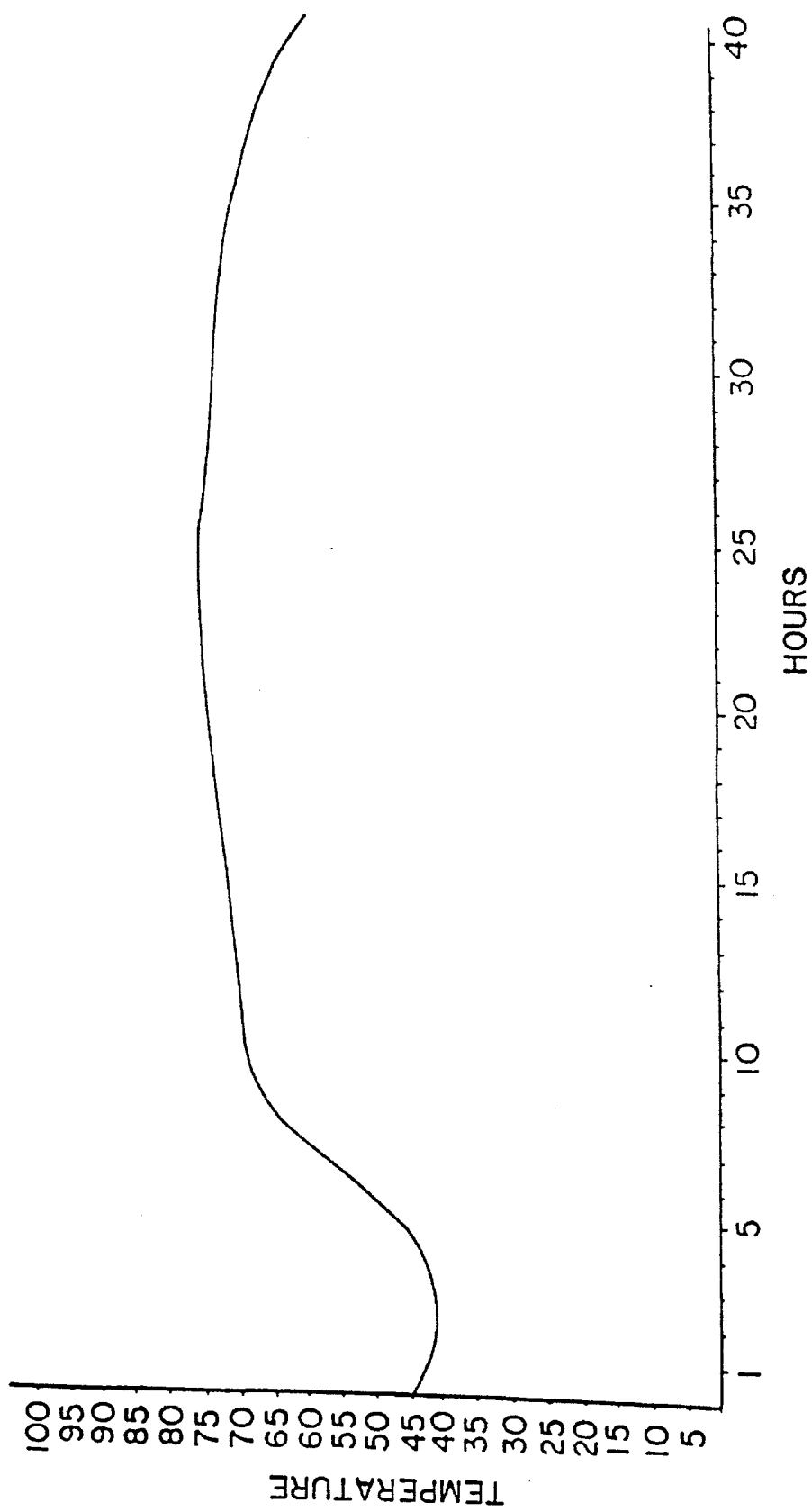
FIG. 5 is a time course plot of temperature of materials under treatment.

FIG. 5 shows a time course of temperature of treated materials from the start to the end of fermentation when treated by the method and device of the present invention. The moisture content of the material treated was 54%. The temperature at the time of heating was 63° C. and the temperature at the time of pulverizing and discharging was 46° C.

INDUSTRIAL APPLICATION POSSIBILITY OF THE INVENTION

By the present invention, as stated above, temperature of the raw materials is suddenly elevated by mechanical compression, cutting and kneading, then the materials are released suddenly into a low pressure atmosphere, and are evenly exposed to oxygen by the contact with air while being pulverized. Therefore, microorganisms in the treated materials are activated because of physical and thermal stimulations, by which fermentation is highly enhanced. Because of these reasons, composting is accomplished within only several days, otherwise it takes 5–6 months by conventional methods, and homogeneous fertilizers of good quality are obtained.

Because of the short treating time, no generation of bad odor and waste water since remarkable decrease in number of mesophilic and anaerobic microorganisms, and requirements for a site of one of several tenth compared to conventional methods, and in situ treatment of excrements, the present invention contributes very much to prevention of pollution and improvement of environment.

Furthermore, resultant composts gave better results against root eelworm, and growth of microorganisms in the soil was also observed to be better than those obtained by the applications of composts produced by conventional process which had been prepared spending several months of time.

These facts show that the fertilizers prepared by the present invention are less decomposed and contain more nutrients for soils, which enhance propagation of soil microorganisms, and as the result thereof, parasitic microorganisms are repressed and harmful worms are decreased. The present invention is very useful because the products thereby accomplish the primary purpose of organic fertilizers.

I claim:

1. Device for manufacturing of organic fertilizers which comprises a cylindrical primary treatment tank and a cylindrical secondary treatment tank, the front end of the cylindrical primary treatment tank being provided with a hopper for feeding of raw materials and the rear end, being connected to the rear end of the cylindrical secondary treatment tank which is equipped with an opening for taking out of products, through an open/close gate, wherein said primary treatment tank is further provided with a screw conveying system and a cutting/kneading system therein, and said secondary treatment tank is further provided with rotary blades for fine cutting therein.

2. Device for manufacturing of organic fertilizers according to claim 1, wherein the cutting/kneading system consists of multiple rotary blades provided on a rotary shaft in said primary treatment tank, and multiple fixed blades projecting to the inside of cylindrical treatment tank and being sufficiently close to the corresponding rotary blades so as to prevent co-rotation of the raw materials with the rotary blades.

3. Device for manufacturing of organic fertilizers according to claim 2, wherein the projection length of said fixed blades elevated inward are adjustable.

* * * * *